Sept. 24, 1957 W. H. WALLO 2,807,791
SOLDER LUG COLLAR
Filed Aug. 17, 1954
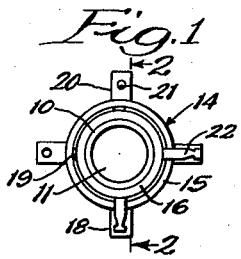
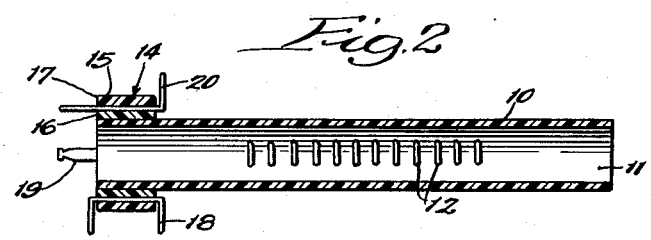
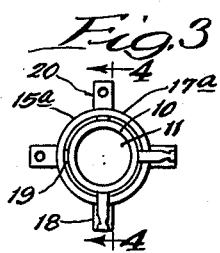
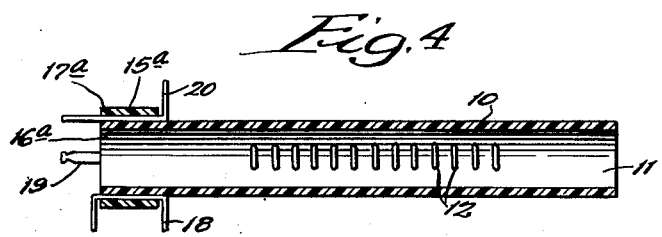
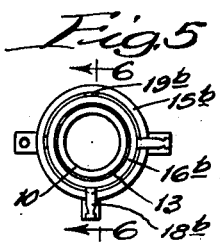
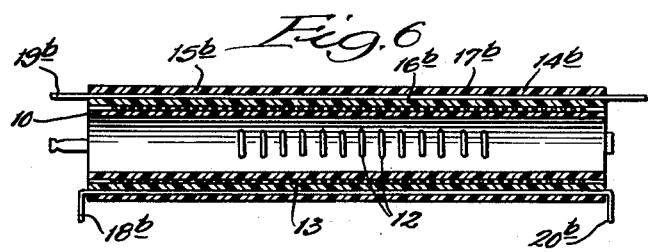
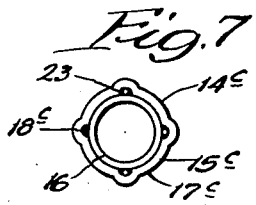
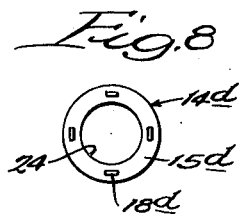
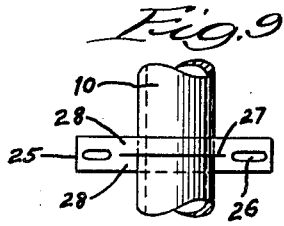
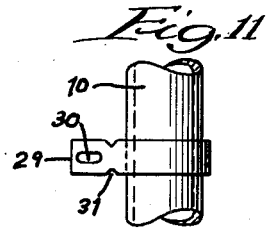
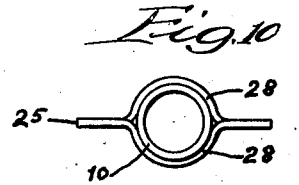
INVENTOR.
William H. Wallo,
BY
Dawson, Tilton & Graham,
ATTORNEYS.

United States Patent Office 2,807,791
Patented Sept. 24, 1957

2,807,791
SOLDER LUG COLLAR
William H. Wallo, Chicago, Ill.
Application August 17, 1954, Serial No. 450,503
2 Claims. (Cl. 339—221)

This invention relates to a solder lug collar, and more particularly to a solder lug assembly especially useful with electric coil forms to provide terminals or connectors for the electric windings thereon. While having great utility in this environment, it will be apparent that the assembly is useful in other settings.

It is, accordingly, an object of this invention to provide a soldering lug assembly that will overcome the disadvantages inherent in prior art structures. Another object of the invention is to provide a solder lug assembly which can be quickly and easily mounted upon a coil form, and which can be solidly anchored thereto by means of providing a large contact area between the collar and coil form. Preferably, the collar is concentric with the tubular coil form and engages the same throughout the entire circumferential area enclosed by the collar. Still another object is in the provision of a solder lug assembly in which the solder lugs project beyond the end of the collar and coil form, whereby electrical connection can be made to the solder lugs in a dip soldering operation wherein the lugs and the wires secured thereto are dipped bodily and momentarily into molten solder. Outward extension of the soldering lugs also permit, where desired, the use of a coil so equipped as a plug-in element in, for example, a printed circuit.

A further object of the invention is in providing a solder lug assembly having a collar adapted to be concentrically mounted about a coil form and the electrical coil wound thereabout, the collar serving to protect the wire mechanically and to insulate it electrically while the arrangement also results in a more compact coil form structure in that the excessive length of the usual coil form can be eliminated since it is usefuly only in providing a mounting for a soldering collar, and in this instance is not required. Still a further object is to provide a solder lug assembly comprising a collar having a central opening therethrough adapted to receive a coil form therein, and which has embedded therein and extending axially thereof one or more spaced-apart soldering lugs. Yet a further object is in the provision of an assembly as described having an inner band adapted to be mounted upon a coil form and an outer band concentric therewith, a plurality of soldering lugs being interposed between the inner and outer bands and being frictionally held thereby. Additional objects and advantages will appear as the specification proceeds.

Embodiments of the invention are illustrated in the accompanying drawings, in which—

Figure 1 is an end view in elevation of a coil structure embodying the invention; Figure 2 is a longitudinal sectional view taken on the line 2—2 of Figure 1; Figure 3 is an end view in elevation of a modified form of the invention; Figure 4 is a longitudinal sectional view taken on the line 4—4 of Figure 3; Figure 5 is an end view in elevation of a further form of the invention; Figure 6 is a longitudinal sectional view of the structure illustrated in Figure 5 and taken on the line 6—6 thereof; Figure 7 is an end view in elevation of a further modified form of the invention; Figure 8 is an end view in elevation of still another modification; Figure 9 is a broken side view in elevation showing a modification; Figure 10 is an end view of the structure shown in Figure 9; Figure 11 is a side view in elevation of a further modification; and Figure 12 is an end view in elevation of the structure shown in Figure 11.

The coil forms with which the solder lug assemblies are useful are shown best in Figures 2, 4 and 6. In each instance the coil form is designated with the numeral 10. The coil form 10 in the specific illustration set out comprises an elongated tube having a central passage 11 therethrough, and which may be equipped with a plurality of threads 12 which extend inwardly and into the central passage 11. The threads 12 may take any desired form and, as shown, may be embossed rows of threads that are pressed inwardly from the outside of the tube. The coil forms 10 may take any desired configuration and the cylindrical character of the form shown is given solely for purposes of illustration. The coil form 10 may also be formed from any suitable material, and one that has found particularly wide usage in the electronics industry is a laminated paper tube that is impregnated with a resin plastic to give it rigidity and to provide certain desirable electrical characteristics such as good dielectric properties. The coil form 10 will have wound thereabout an electrical conductor which most generally will be a copper wire, and the wire will be helically wound to provide the coil 13 which consists of a plurality of turns wound exteriorly about the outer surface of the form.

In the form of the solder lug assembly shown in Figure 2, the assembly is designated with the numeral 14 and comprises a collar 15 having an inner band or sleeve 16, and mounted thereabout an outer band or sleeve 17. The inner band 16 will have a central opening therethrough that conforms substantially to the configuration or cross-sectional shape of the coil form 10 and then, in the illustration of Figure 2, the band and opening therethrough are cylindrical to accommodate the cylindrical or tubular form 10. It will be apparent that the band 16 may be square or rectangular or may have any other shape that is required to match it with the cross-sectional shape of the form 10. The outer band 17 will be similar to the inner band 16 and will be adapted to mate therewith. As shown then, where the band 16 is cylindrical the band 17 will also be cylindrical and will be mounted concentrically about the inner band. Therefore, the inner diameter of the band 17 will be substantially the same or slightly greater than the outer diameter of the band 16.

Interposed between the inner and outer bands 16 and 17 are the solder lugs 18. One or more solder lugs 18 will be provided and preferably, as shown in the illustration, four spaced-apart soldering lugs will be provided for each of the solder lug assemblies 14. The soldering lugs 18 will be metal and will be relatively good electrical conductors. Necessarily then, the collars 15 will have inner and outer bands that are formed from an insulating material so that each of the spaced-apart soldering lugs will be electrically separated from the others. The collars 15 can be formed from any suitable material, and I have found that they may be provided by segmenting at desired lengths laminated paper tubes such as those used in forming the coil forms 10, and in the same manner the bands 16 and 17 may be resin impregnated.

The solder lugs 18 have end portions that extend outwardly beyond the collar 15 and beyond the end of the coil form 10. The free end portions of the solder lugs may be straight and extend along the axis of the collar as is indicated by the numeral 19. On the other hand, where it is found desirable, one or both ends of the solder lug may be turned laterally as indicated at 20. It will be apparent that each of the solder lugs may have one end portion that extends axially, outwardly beyond the end of the coil form, while the inner end portions are turned laterally as indicated at 20, or any combination of these arrangements may be provided. The particular arrangement will depend to a large extent upon the use intended for the coil. For example, if it is desired to dip solder in order to connect the ends of the coil 13 and whatever electrical elements required to the lugs 18, it will be advantageous to have the end portion of the lugs extend axially as shown at 19, for then these lugs can be dipped bodily into molten solder. This same arrangement will permit the coils to be used as plug-in elements in printed circuit arrangements or any other circuit combination. Where required, one or both of the free end portions of each solder lug can be turned laterally as shown at 20, and these lateral projections may be at right angles to the longitudinal axis of the collars or may have any suitable angle of inclination.

The solder lugs 18 may be flat strips as shown in Figures 1 and 2 or they may be round or rectangular, etc. The particular shape of the solder lugs is not critical insofar as this invention is concerned, and the end portions of each solder lug may be formed to provide the most advantageous type of connection for the ends of the coil 13 and for the other electrical conductors connected thereto. For example, an end 20 of the solder lugs may be equipped with an aperture 21 therethrough, while the other end of each solder lug may have a restricted neck portion 22 to permit a wire conductor to be wound thereabout.

I have found that it may be advantageous at times to employ one end portion of the coil form 10 as the inner sleeve or band 16 of the collar structure. This form of the invention is illustrated in Figures 3 and 4. For purposes of identification, this collar structure is designated with the numeral 15a, the end portion of the form 10 which serves as the inner band is designated with the numeral 16a and the outer band is designated with the numeral 17a. The solder lugs 18 can be identical with those heretofore described, and therefore are designated with the same numerals. In this form of the invention the coil form 10 is part of the solder lug assembly and the solder lugs 18 are frictionally located between the end portion of the coil form and the outer band 17a.

I have found that there are numerous instances where it is desirable to electrically and mechanically insulate the coil 13, and at the same time to reduce the overall length of the coil assembly. Generally, the coil 13 does not extend the full length of the coil form 10, but terminates at a spaced distance from the ends thereof and the free end portions of the coil form afford the mountings for the solder lug assemblies. Space can be saved then by simply terminating the coil form 10 adjacent the ends of the wire coil wound thereabout if means can be provided for mounting the solder lug assembly over the wire coil 13. Means for accomplishing this is illustrated in Figures 5 and 6 wherein the solder lug assembly 14b comprises elongated inner and outer bands or sleeves 16b and 17b. The inner diameter of the band 16b is selected so that the band can receive therein the coil form 10 together with the coil 13 wound thereabout. The collar 15b can be made long enough so that it encloses all of the coil 13, as shown in Figure 6, or it can be made any other length so that portions of the coil can be left exposed.

The soldering lugs have the same configurations as those heretofore described, and depending upon the particular use the solder lugs 18b may have free end portions 19b that extend outwardly and axially along the collar 15b or the end portions, or one of them may be turned laterally as shown at 20b.

A further modification of the basic structure so far described is shown in Figure 7. In this form of the invention the solder lug assembly 14c comprises a collar 15c having an inner band 16c and an outer band 17c. The outer band 17c may be provided with a plurality of spaced-apart longitudinally extending passages therethrough which are designated with the numeral 23. The passages 23 may be formed by pressing outwardly portions of the band 17c. The openings 23 are adapted to receive therein the solder lugs 18c which, in form shown in Figure 7, are generally cylindrical. The end portions of the solder lugs 18c may extend axially or they may be turned laterally, all as has been heretofore described. It will be clear that the collar 15c may have an inner band provided by the free end portions of the coil form, such as shown in the embodiment of the invention illustrated in Figure 4.

The modification of the invention shown in Figure 8 comprises a solder lug assembly 14d having a collar 15d comprised of a single band provided with an opening 24 through the center thereof adapted to receive a coil form therein. Embedded within the collar at spaced-apart points thereabout are the soldering lugs 18d, which again may have end portions oriented in any suitable manner. The collar 15d may be provided by spirally winding a plurality of paper laminations about the customary winding mandrel, and by interposing between certain adjacent layers the soldering lugs 18d. The collar 15d may be a molded plastic member in which the solder lugs 18d are embedded within the plastic in the molding operation.

In use of any of the forms of the invention described, the solder lug assemblies are simply mounted upon the coil forms, and if the dimensions are accurately maintained the collars may be held tightly upon the forms by the frictional grip therebetween. If found necessary or desirable, adhesives may be employed to anchor the collars to the coil forms. This is also true of the form shown in Figure 6 wherein the collar structure encloses the coil 13. It is noted that in each instance the collar structure engages throughout substantially its entire inner circumferential area the surface of the coil form 10. There is no problem presented of securing, though, quick and easy mounting of the collars upon the coil forms for the collars are not distorted and are readily alignable with, and fit concentrically about, the coil forms.

Occasionally, there is need for a single terminal secured to a coil form. Advantageous forms of a single terminal arrangement are illustrated in Figures 9 through 12. In Figures 9 and 10 the coil form 10 is provided with a solder lug assembly 25 that comprises a strip of metal selected so as to have good conductivity, and that strip may be provided adjacent its ends with apertures 26 therethrough. The apertures are useful in securing electric conductors to the solder lug assembly.

The terminal 25 is severed along a longitudinal line 27 to form the clamp legs 28 which, as is shown in Figure 10, can be bowed outwardly for receiving the coil form 10 therebetween. The assembly 25 may then be firmly anchored to the coil form 10 by drawing the bowed legs 28 together so as to clamp about the coil form. Advantageously, cement may be employed to form a permanent connection between the coil form and terminal strip.

In the form of the single terminal connector illustrated in Figures 11 and 12, the coil form 10 has mounted thereon the solder lug assembly or terminal strip 29 that is formed by rolling the strip upon itself and bringing the end portions into contiguous relation, as is shown best in Figure 12. The terminal end portions may be provided with apertures 30 therethrough that come into alignment when the end portions are in abutting relation. If desired, notches 31 may be employed adjacent the end portions of the terminal strip and serve as a positioner for a wraparound wire that could be used in drawing the end portions of the terminal strip together. Adhesives or cement may be employed for permanently uniting the coil form 10 and the terminal strip 29.

In the embodiment of the invention shown in Figures 5 and 6, the inner and outer sleeves of the solder lug assembly extend substantially from end to end of the coil form 10 and enclose all of the turns 13 of the wire coil. It will be appreciated, however, that the length of the inner and outer sleeves may be varied as desired and, for example, they might have approximately the same length as the inner and outer sleeves of the coil form shown in Figures 1 and 2. The shortened solder lug assembly might be positioned at any point along the coil form 10. In the forms of the structure disclosed in Figures 1 through 8, each of the solder lugs provides two points of connection and these points may be used, for example, by the coil manufacturer and by the user of the coil. That is, one of the points of connection on each of the solder lugs may be used by the coil manufacturer as points of connection for the ends of the coil, while the other points of connection on the solder lugs may be employed by the user of the coil as points of connection for the circuits that incorporate the coil.

While in the foregoing specification, embodiments of the invention have been set out in considerable detail for purposes of illustration, it will be apparent to those skilled in the art that numerous changes may be made in these details without departing from the spirit and principles of the invention.

I claim:

1. For use with a coil form, a separate, unitary solder-lug assembly, said assembly comprising an inner band defining a central open area dimensioned to frictionally receive said coil form coaxially with said opening, a plurality of solder-lugs peripherally spaced about and in contact with the outer surface of said band, a second band substantially identical with said first band in plan form, said second band surrounding said first band and said solder-lugs, and having its entire inner surface in frictional engagement with the outer surface of said first band except for those areas of the inner surface of said second band opposed to said solder-lugs, said opposed areas being in frictional engagement with said solder-lugs effectively to retain said solder-lugs between said bands, each said solder-lugs having opposite end portions extending in opposite directions outwardly from said bands.

2. For use with a coil form, a separate, unitary solder-lug assembly comprising an inner circular band of fibrous material, said inner band defining a central aperture dimensioned to frictionally, coaxially receive a portion of said coil form, an outer circular band of fibrous material having a thickness substantially equal to the thickness of said first band, a plurality of solder-lugs circumferentially spaced and positioned between the said bands, said outer band frictionally engaging said solder-lugs and all of the outer surface of said inner band between each adjacent pair of said solder-lugs, said solder-lugs being frictionally held in place between and by said bands, said inner band being round, said outer band being round except for the areas thereof overlying and engaging said solder-lugs, said areas being outwardly offset a distance substantially equal to the thickness of said solder-lugs, each of said solder-lugs having opposite end portions extending in opposite directions from said bands.

References Cited in the file of this patent

UNITED STATES PATENTS

| 1,874,744 | Hathorn | Aug. 30, 1932 |
| 1,911,612 | Eckstein | May 30, 1933 |
| 2,083,836 | Glade | June 15, 1937 |
| 2,445,587 | Sims | July 20, 1948 |
| 2,497,484 | Wood | Feb. 14, 1950 |
| 2,557,571 | Siegel | June 19, 1951 |
| 2,682,595 | Rubinstein | June 29, 1954 |
| 2,698,372 | Patla | Dec. 28, 1954 |

FOREIGN PATENTS

| 70,624 | Norway | July 1, 1946 |